United States Patent
Lee et al.

(10) Patent No.: US 8,704,539 B2
(45) Date of Patent: Apr. 22, 2014

(54) MINUTE IMPEDANCE VARIATION DETECTION DEVICE

(75) Inventors: Hsiang-Yu Lee, New Taipei (TW); Ping-Tsun Lin, Taipei (TW)

(73) Assignee: Invention Element Inc., Taoyuan County (TW)

( * ) Notice: Subject to any disclaimer, the term of this patent is extended or adjusted under 35 U.S.C. 154(b) by 166 days.

(21) Appl. No.: 13/361,481

(22) Filed: Jan. 30, 2012

(65) Prior Publication Data

US 2012/0194204 A1   Aug. 2, 2012

(30) Foreign Application Priority Data

Jan. 31, 2011   (TW) .............................. 100103659 A

(51) Int. Cl.
*G01R 27/08*   (2006.01)
(52) U.S. Cl.
USPC ........................................................ 324/705
(58) Field of Classification Search
USPC ......... 324/762.01–762.1, 705, 750.01–750.3; 257/48; 438/14–18
See application file for complete search history.

(56) References Cited

U.S. PATENT DOCUMENTS 6,366,099 B1 *   4/2002   Reddi .......................... 324/678
6,734,685 B2 *   5/2004   Rudrich ....................... 324/661

* cited by examiner

*Primary Examiner* — Tung X Nguyen
(74) *Attorney, Agent, or Firm* — Muncy, Geissler, Olds & Lowe, P.C.

(57) ABSTRACT

A minute impedance variation detection device includes a differential amplifier, first and second impedances, a sensing electrode and a signal source. The differential amplifier has first and second input ends and an output end. The first impedance is connected to the first input end. The second impedance is connected to the second input end. The sensing electrode is connected to the second input end for sensing a touch and thus receiving a touch signal. The signal source is connected to the first impedance and the second impedance for providing an input signal inputted to the first impedance and the second impedance. The first impedance has an impedance value close to that of the second impedance. The differential amplifier is based on the input signal and the touch signal to differentially amplify the touch signal.

8 Claims, 5 Drawing Sheets

US 8,704,539 B2

MINUTE IMPEDANCE VARIATION DETECTION DEVICE

CROSS REFERENCE TO RELATED APPLICATION

This application claims the benefits of the Taiwan Patent Application Serial Number 100103659, filed on Jan. 31, 2011, the subject matter of which is incorporated herein by reference.

BACKGROUND OF THE INVENTION

1. Field of the Invention

The present invention relates to an impedance detection device and, more particularly, to a minute impedance variation detection device.

2. Description of Related Art

Generally, the existed touch panels can be classified into resistive type and capacitive type. The resistive touch panels have been developed much earlier than others and thus occupy the major market, while the capacitive touch panels are also in widespread use recently.

The resistive touch panel is formed by stacking an upper ITO (Indium Tin Oxide) conductive layer and a lower ITO conductive layer. In actual operation, the pressure applied to the surface of the resistive touch panel makes the electrode of the upper conductive layer to be conducted with the electrode of the lower conductive layer, and a controller is employed to detect the voltage variation of the touch panel so as to compute the position of the contact point thereby to proceed as an input. When a user touches a certain point on the surface of the touch panel, current flows conducted makes an activation, and the controller therefore computes the position of the activated point. However, for the touch panel with such a dual-layer ITO structure, the layer gap for connecting ITO electrodes on the same plane is relatively narrow, and thus it is likely to cause short circuit problem, resulting in detection errors.

Furthermore, in the development of the capacitive touch panel, the major factors that affect the self-capacitance are the electric field of human body and the contact area, in which the electric field of human body typically carries signals due to the influence of the electric field of earth. In order to effectively reduce the influence of the electric field of human body, the measurement circuit generally applies the mean value to compute the capacitance value. That is, the mean value of the capacitance values computed for multiple times is taken to determine whether there is a touch input. Therefore, if the electric field of human body and the electric field of earth are treated as noises, the accuracy and stability of the capacitive touch panel are greatly influenced.

Accordingly, in use of the aforementioned touch-control device, it is difficult to avoid the influence of noises from circuit, electric field, power source, etc. In addition, based on the consideration of accuracy and stability, ITO electrodes with smaller resistance value are typically used in the aforementioned touch-control device, and thus it is difficult to manufacture large-sized touch panel, resulting in a restriction of developing the touch panel.

SUMMARY OF THE INVENTION

The object of the present invention is to provide a minute impedance variation detection device, which is suitable for ITO electrodes with larger resistance value and large-sized touch panel.

To achieve the object, there is provided a minute impedance variation detection device, which comprises: a differential amplifier including a first input end, a second input end and an output end; a first impedance having a first end and a second end electrically connected to the first input end; a second impedance having a first end and a second end electrically connected to the second input end of the differential amplifier; a sensing electrode electrically connected to the second input end of the differential amplifier for sensing a touch and thus receiving a touch signal; and a signal source electrically connected to the first end of the first impedance and the first end of the second impedance for providing an input signal inputted to the first impedance and the second impedance. The first impedance has an impedance value close to that of the second impedance, and the differential amplifier is based on the input signal and the touch signal to amplify differentially the touch signal and output the differentially amplified touch signal on the output end.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
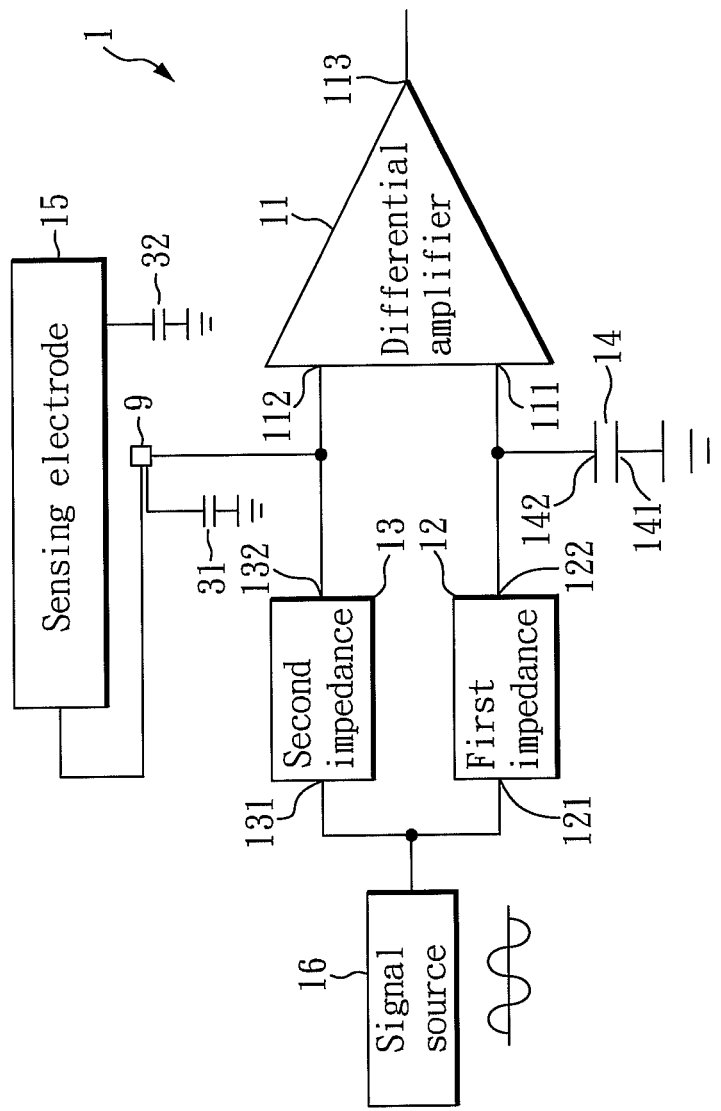
FIG. 1 is a system diagram of the minute impedance variation detection device in accordance with the first embodiment of the present invention.

With reference to FIG. 1, there is shown a system diagram of the minute impedance variation detection device in accordance with the first embodiment of the present invention. As shown, the minute impedance variation detection device 1 of the present invention includes: a differential amplifier 11; a first impedance 12 having two ends 121, 122; a second impedance 13 having two ends 131, 132; a first capacitor 14 having two ends 141, 142; a sensing electrode 15; and a signal source 16. The differential amplifier 11 includes a first input end 111, a second input end 112, and an output end 113. The end 122 of the first impedance 12 and the end 142 of the capacitor 14 are electrically connected to the first input end 111 of the differential amplifier 11. The end 141 of the capacitor 14 is connected to ground. It is to be noted that the first capacitor 14 can be a physical capacitor or a parasitic capacitor existed on an integrated circuit pin (not shown). The end 132 of the second impedance 13 and the sensing electrode 15 are electrically connected to the second input end 112 of the differential amplifier 11. The signal source is electrically connected to the end 121 of the first impedance 12 and the end 131 of the second impedance 13. The sensing electrode 15 is provided for sensing a touch, so as to receive a touch signal. In this embodiment, the sensing electrode 15 receives the touch signal when a touch from a finger, conductor or object is sensed. The signal source 16 provides an input signal for being inputted to the first impedance 12 and the second impedance 13. In this embodiment, the signal source 16 inputs a periodic signal to the first impedance 12 and the second impedance 13.

In this embodiment, the sensing electrode 15 is electrically connected to the second input end 112 of the differential amplifier 11 via an integrated circuit pin 9. The integrated circuit pin 9 has a first parasitic capacitance 31, and the sensing electrode 15 also has a second parasitic capacitance 32.

In the minute impedance variation detection device of the present invention, the impedance value of the first impedance 12 is close to, or even equal to, the impedance value of the second impedance 13. The differential amplifier 11 based on the input signal and the touch signal amplify differentially the touch signal and output the differentially amplified touch signal to the output end 113. Because the input signal is inputted in-between the first impedance 12 and the second impedance 13 with the similar impedance value, the input signal is transmitted to the first input end 111 and the second input end 112 of the differential amplifier. When the impedance value of the first impedance 12 is close to the impedance value of the second impedance 13, and the capacitance value of the first capacitor 14 is close to, or even equal to, the capacitance value of the first parasitic capacitance 31 and second parasitic capacitance 32 connected in parallel, the differentially amplified output signal (touch signal) is close to zero because the circuits above and below the signal source are symmetric. The signal source 16 of the present invention input a periodic signal to the first impedance 12 and the second impedance 13. The periodic signal can be, for example, sine wave, square wave, triangle wave, etc. Alternatively, the signal source 16 of the present invention can also input a non-periodic signal or even a noise signal to the first impedance 12 and the second impedance 13, and the differentially amplified output signal is also close to zero.

In this embodiment, the capacitance value of the first capacitor 14 is close to, or even equal to, the capacitance value of the first parasitic capacitance 31 and second parasitic capacitance 32 connected in parallel. When a finger, conductor or object approaches or contacts the sensing electrode 15, the value of the second parasitic capacitance 32 of the sensing electrode 15 is changed, and thus the divided voltage and phase resulted on the input end 112 of the differential amplifier are changed, so that the voltages on the first input end 111 and on the second input end 112 are different from each other. Such a phenomenon is analogous to out of balance of a balance in which the balance is inclined toward the heavy end. Therefore, after the differential amplification of the differential amplifier 11, the output end 113 thereof outputs the amplified touch signal. By measuring the output variation of the differential amplifier 11, it is able to distinguish the minute parasitic capacitance variation generated by the sensing electrode 15.

Figure 2:
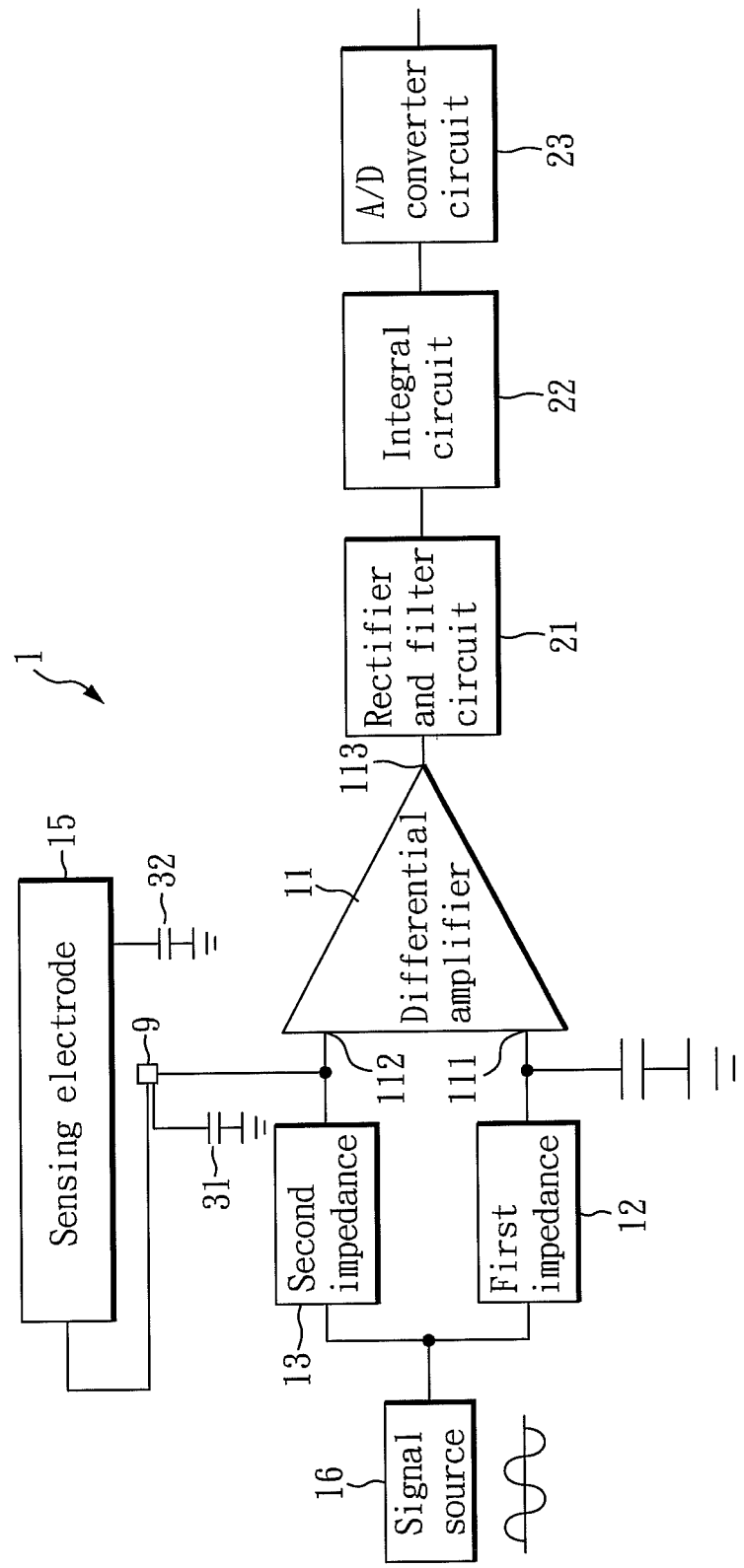
FIG. 2 schematically illustrates a first output circuit for the minute impedance variation detection device in accordance with the first embodiment of the present invention.
Figure 3:
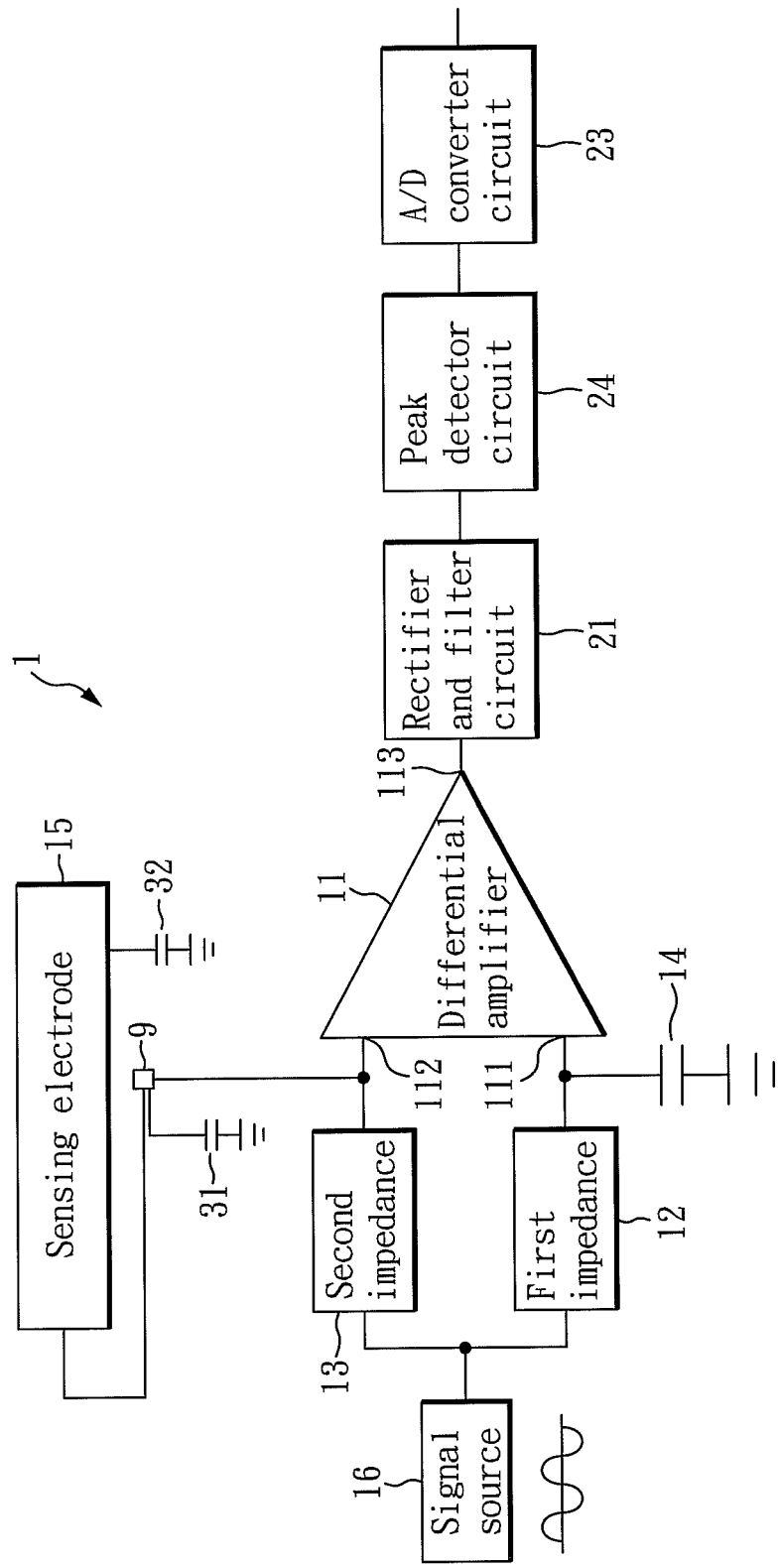
FIG. 3 schematically illustrates a second output circuit for the minute impedance variation detection device in accordance with the first embodiment of the present invention.

Determination of the amplified output signal can be achieved by further connecting an output circuit to the output end 113. As shown in FIG. 2, the present invention further includes a rectifier and filter circuit 21, an integral circuit 22, and an A/D converter circuit 23 for processing the touch signal at the output end 113. The rectifier and filter circuit 21 is electrically connected to the output end 113 of the differential amplifier 11. The integral circuit 22 is electrically connected to rectifier and filter circuit 21. The A/D converter circuit 23 is electrically connected to the integral circuit 22. Alternatively, another output circuit can be used to achieve the same purpose. As shown in FIG. 3, this output circuit includes a rectifier and filter circuit 21, a peak voltage detector circuit 24, and an A/D converter circuit 23. The rectifier and filter circuit 21 is electrically connected to the output end 113 of the differential amplifier 11. The peak voltage detector circuit 24 is electrically connected to the rectifier and filter circuit 21. The A/D converter circuit 23 is electrically connected to the peak voltage detector circuit 24.

Figure 4:
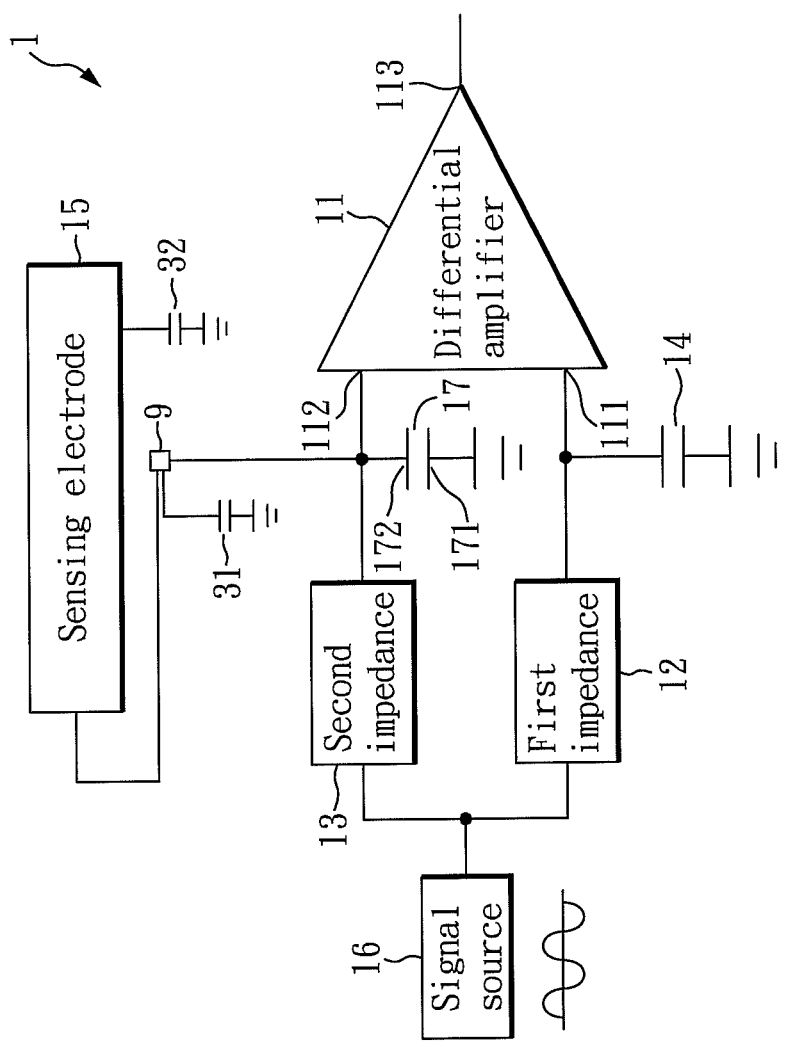
FIG. 4 is a system diagram of the minute impedance variation detection device in accordance with the second embodiment of the present invention.

Then, with reference to FIG. 4, there is shown a system diagram of the minute impedance variation detection device in accordance with the second embodiment of the present invention. As shown in FIG. 4, the circuit diagram of this embodiment is similar to that of the first embodiment, except that a second capacitor 17 is added. The second capacitor 17 has a first end 171 connected to ground and a second end 172 electrically connected to the second input end 112 of the differential amplifier 11. The capacitance value of the second capacitor 17, the first parasitic capacitance 31 and second parasitic capacitance 32 that are connected in parallel is close to, or even equal to, the capacitance value of the first capacitor. Therefore, the first input end 111 and the second input end 112 of the differential amplifier 11 are connected with capacitors of the similar capacitance value.

Figure 5:
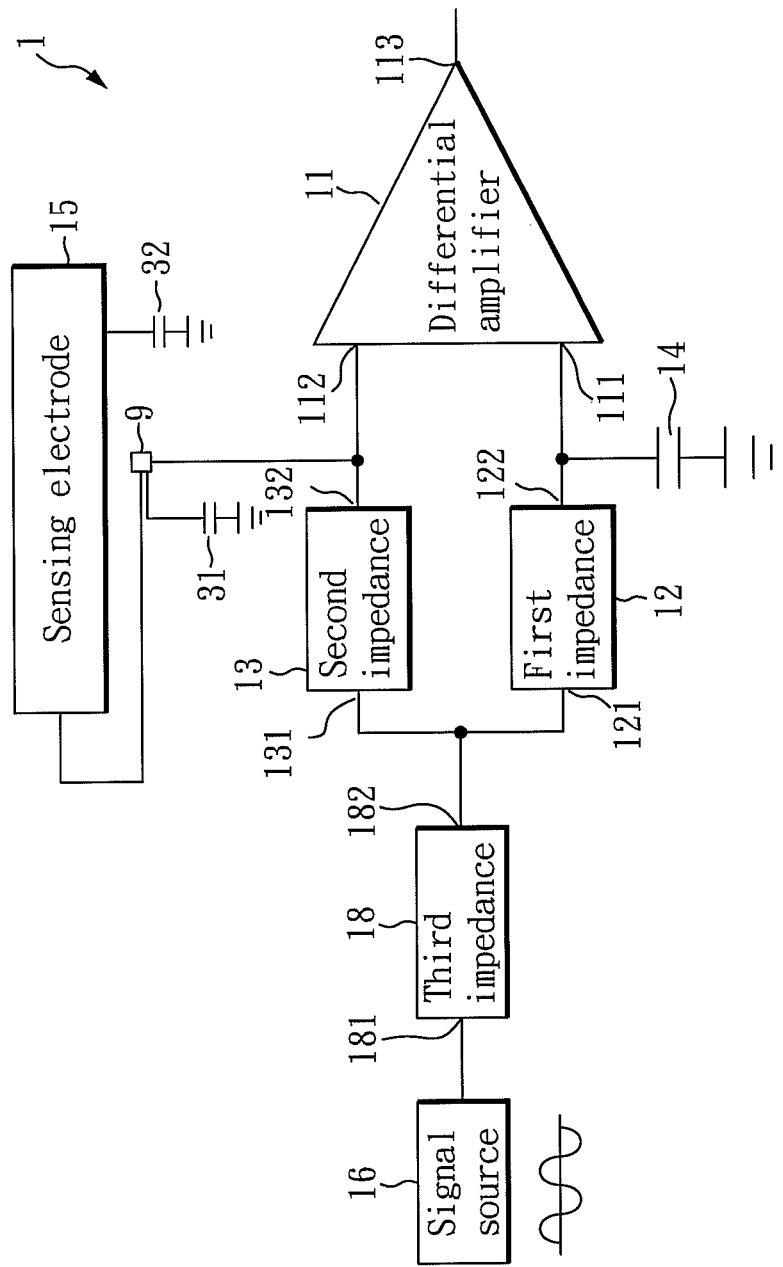
FIG. 5 is a system diagram of the minute impedance variation detection device in accordance with the third embodiment of the present invention.

Moreover, with reference to FIG. 5, there is shown a system diagram of the minute impedance variation detection device in accordance with the third embodiment of the present invention. As shown in FIG. 5, the circuit diagram of this embodiment is similar to that of the first embodiment, except that a third impedance 18 is added. The third impedance 18 has two ends 181, 182 respectively connected to the signal source 16 and the ends 121, 131 of the first and second impedances 12, 13. When voltages distributed on the first impedance 12 and second impedance 13 are not completely the same, the third impedance 18 can be used for adjustment for such a difference. Preferably, the third impedance 18 is preferably a resistor.

Accordingly, with the minute impedance variation detection device 1 of the present invention, it is able to eliminate the interference caused by noises from circuit, power source, etc. In addition, the present invention is able to measure very tiny variation, so as to provide a relatively high sensitivity. The present invention is also suitable for ITO electrodes with larger resistance value, and large-sized touch panels, thereby possessing high adaptability.

Although the present invention has been explained in relation to its preferred embodiment, it is to be understood that many other possible modifications and variations can be made without departing from the spirit and scope of the invention as hereinafter claimed.

What is claimed is:

1. A minute impedance variation detection device, comprising:
   a differential amplifier including a first input end, a second input end and an output end;
   a first impedance having a first end and a second end electrically connected to the first input end of differential amplifier;
   a second impedance having a first end and a second end electrically connected to the second input end of differential amplifier;
   a sensing electrode electrically connected to the second input end of the differential amplifier for sensing a touch and thus receiving a touch signal;
   a signal source electrically connected to the first end of the first impedance and the first end of the second impedance for providing an input signal inputted to the first impedance and the second impedance; and a first capacitor electrically connected to the first input end of the differential amplifier, the first capacitor being a physical capacitor or a parasitic capacitor existed on an integrated circuit pin;

wherein the first impedance has an impedance value close to that of the second impedance, and the differential amplifier based on the input signal and the touch signal to amplify differentially the touch signal and output the differentially amplified touch signal to the output end;

wherein the sensing electrode is electrically connected to the second input end of the differential amplifier via an integrated circuit pin having a capacitance value of first parasitic capacitor; the sensing electrode has a capacitance value of second parasitic capacitor; the first capacitor has a capacitance value close to that of the first parasitic capacitor and second parasitic capacitor connected in parallel.

2. The minute impedance variation detection device as claimed in claim 1, wherein the signal source provides a periodic signal for being inputted to the first impedance and the second impedance.

3. The minute impedance variation detection device as claimed in claim 2, wherein the sensing electrode receives the touch signal when a finger, conductor or object is approached or contacted.

4. The minute impedance variation detection device as claimed in claim 1, further comprising a second capacitor having a first end connected to ground and a second end electrically connected to the second input end of the differential amplifier, wherein a capacitance value of the second capacitor, the first parasitic capacitor and second parasitic capacitor being connected in parallel is close to the capacitance value of the first capacitor.

5. The minute impedance variation detection device as claimed in claim 1, further comprising a third impedance having a first end connected to the signal source and a second end connected to the first ends of the first and second impedances.

6. The minute impedance variation detection device as claimed in claim 5, wherein the third impedance is preferably a resistor.

7. A minute impedance variation detection device, comprising:
  a differential amplifier including a first input end, a second input end and an output end;
  a first impedance having a first end and a second end electrically connected to the first input end of differential amplifier;
  a second impedance having a first end and a second end electrically connected to the second input end of differential amplifier;
  a sensing electrode electrically connected to the second input end of the differential amplifier for sensing a touch and thus receiving a touch signal;
  a signal source electrically connected to the first end of the first impedance and the first end of the second impedance for providing an input signal inputted to the first impedance and the second impedance;
  a first capacitor electrically connected to the first input end of the differential amplifier, the first capacitor being a physical capacitor or a parasitic capacitor existed on an integrated circuit pin;
  a rectifier and filter circuit electrically connected to the output end of the differential amplifier;
  an integral circuit electrically connected to rectifier and filter circuit; and
  an A/D converter circuit electrically connected to the integral circuit;
  wherein the first impedance has an impedance value close to that of the second impedance, and the differential amplifier based on the input signal and the touch signal to amplify differentially the touch signal and output the differentially amplified touch signal to the output end.

8. A minute impedance variation detection device, comprising:
  a differential amplifier including a first input end, a second input end and an output end;
  a first impedance having a first end and a second end electrically connected to the first input end of differential amplifier;
  a second impedance having a first end and a second end electrically connected to the second input end of differential amplifier;
  a sensing electrode electrically connected to the second input end of the differential amplifier for sensing a touch and thus receiving a touch signal;
  a signal source electrically connected to the first end of the first impedance and the first end of the second impedance for providing an input signal inputted to the first impedance and the second impedance;
  a first capacitor electrically connected to the first input end of the differential amplifier, the first capacitor being a physical capacitor or a parasitic capacitor existed on an integrated circuit pin;
  a rectifier and filter circuit electrically connected to the output end of the differential amplifier;
  a peak voltage detector circuit electrically connected to the rectifier and filter circuit; and
  an A/D converter circuit electrically connected to the peak voltage detector circuit;
  wherein the first impedance has an impedance value close to that of the second impedance, and the differential amplifier based on the input signal and the touch signal to amplify differentially the touch signal and output the differentially amplified touch signal to the output end.

* * * * *